United States Patent [19]

Sugimoto et al.

[11] Patent Number: 4,801,289

[45] Date of Patent: Jan. 31, 1989

[54] ROCKER PIN TYPE CONTINUOUSLY VARIABLE TRANSMISSION CHAIN

[75] Inventors: Yoshiaki Sugimoto, Tokorozawa; Toshihiro Hosokawa, Hanno, both of Japan

[73] Assignee: Tsubakimoto Chain Co., Japan

[21] Appl. No.: 219,564

[22] Filed: Jul. 14, 1988

[30] Foreign Application Priority Data

Jul. 15, 1987 [JP] Japan ............................ 62-107661[U]

[51] Int. Cl.⁴ ............................................. F16H 13/04
[52] U.S. Cl. ..................................................... 474/215
[58] Field of Search ............................... 474/214–217, 474/206; 59/84, 89

[56] References Cited

U.S. PATENT DOCUMENTS

| 1,734,500 | 1/1930 | Sturtevant | 474/215 |
| 2,669,879 | 2/1954 | Pierce | 474/216 X |
| 4,507,106 | 3/1985 | Cole, Jr. | 474/215 |

Primary Examiner—Thuy M. Bui
Attorney, Agent, or Firm—Steel, Gould & Fried

[57] ABSTRACT

A rocker pin type continuously variable transmission chain comprising a plurality of link plates connected endlessly by paired rocker pins, each of the load transmitting surfaces of each rocker pin insertion bore having an arcuate portion, opposing the planar portion of each rocker pin, with a radius of curvature greater than that of the convex portions of the rocker pins to prevent rotation of the rocker pins in the bores, whereby load forces are transmitted by extensive surface contact areas.

2 Claims, 3 Drawing Sheets

ROCKER PIN TYPE CONTINUOUSLY VARIABLE TRANSMISSION CHAIN

BACKGROUND OF THE INVENTION

1. Field of the Invention

This invention relates to a rocker pin type continuously variable transmission (CVT) chain.

2. Prior Art

A typical CVT chain is shown in FIG. 1, and generally comprises a pair of pulleys P1 and P2 mounted on a driving shaft D and a driven shaft F, respectively; and, a plurality of frictionally driven blocks B connected by means of an endless chain C entrained on said pulleys. Each of the pulleys has opposing conical surfaces S1, S1 and S2, S2 respectively. If the distance between the respective conical surfaces of either or both pulleys is changed, the contact position of the frictionally driven blocks relative to each conical surface is also changed, thereby changing the effective diameter of one or both of the pulleys. The resulting structure is commonly referred to as a "continuously variable transmission".

CVT chains are generally classified into rocker pin types and round pin types. Rocker pin type CVT chains are widely used to form so-called silent chains.

A conventional rocker pin type CVT chain is disclosed in U.S. Pat. No. 4,507,106, wherein the load transmitting surface of a rocker pin is formed by a series of continuous surface elements or portions of arcuate convex planes having different curvatures. On the other hand, the corresponding load transmitting surface of the bore of link plates into which the rocker pins are inserted is formed by a series of complimentary arcuate concave surface elements having different curvatures; and, the complimentary surface elements are adapted to closely fit each other.

The above-mentioned patent teaches that a close fit between the surfaces of the rocker pin and the link plate is hard to achieve because of the necessary manufacturing tolerances. Manufacturing to very close tolerances significantly increases the costs of production.

Moreover, a point or local contact between the load transmitting surfaces of the rocker pin and the link plate is unavoidable, which causes rapid fatigue in, and premature failure, of the link plate.

SUMMARY OF THE INVENTION

It is an object of the invention to provide a rocker pin type CVT chain which is not subject to premature failure from application of localized load forces.

It is another object of this invention to provide a rocker pin type CVT chain which is easier and less expensive to manufacture.

These and other objects of the invention are achieved by an improved rocker pin type CVT chain having a plurality of frictionally driven blocks and a plurality of link plates connected endlessly by means of paired rocker pins, and comprising: the rocker pins each having a load transmitting surface formed by a planar portion and a pair of arcuate convex portions each having the same radius of curvature; the link plates each having rocker pin insertion bores formed to closely fit the convex portions of the rocker pins; and, an arcuate portion of the load transmitting surface of each bore, opposing the planar portion of each rocker pin, having a radius of curvature greater than that of each bore, or rocker pin convex portion, to prevent rotation of the rocker pins in the bores, whereby load forces are transmitted by larger and more extensive surface contact areas than has been true in the past.

The two arcuate convex portions formed in the load transmitting surface of the rocker pin have the same center and the same radii of curvature as the rocker pin insertion bores of the link plates, and consequently, they may easily engage each other with a close fit. The arcuate concave portion formed for preventing rotation of the pins in the rocker pin insertion bores of the link plates opposing the planar portion formed in the load transmitting surface of the rocker pin, has a radius of curvature greater than that of the arcuate convex portion formed in the load transmitting surface of the rocker pin, and consequently, the two arcuate convex portions of each rocker pin may be positively prevented from rotating by means of the opposing arcuate concave portions of each bore of the greater radius of curvature. Accordingly, no slippage will occur between the load transmitting surfaces of the rocker pins and the bores of the link plates.

Despite the fact that the planar portion of the rocker pins opposing the arcuate concave portion does not fit the arcuate concave portions, the lengths of the arcuate convex portions of the rocker pins which do closely fit into the rocker pin insertion bores may be made long enough to ensure a greater load transmission area. Hence, the pressure per unit area may be reduced. Moreover, since the planar portion of the rocker pins does not contact the inner surface of the bores, local concentration of load stresses may be avoided.

DETAILED DESCRIPTION OF THE PREFERRED EMBODIMENTS

Figure 1:
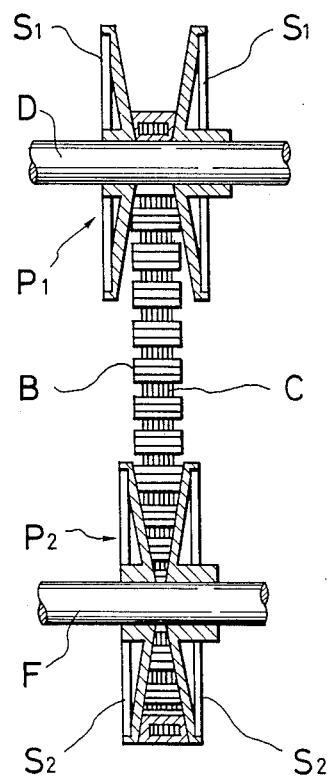
FIG. 1 is a plan view, partially in section, of a typical continuously variable transmission utilizing a frictionally driven endless chain.
Figure 2:
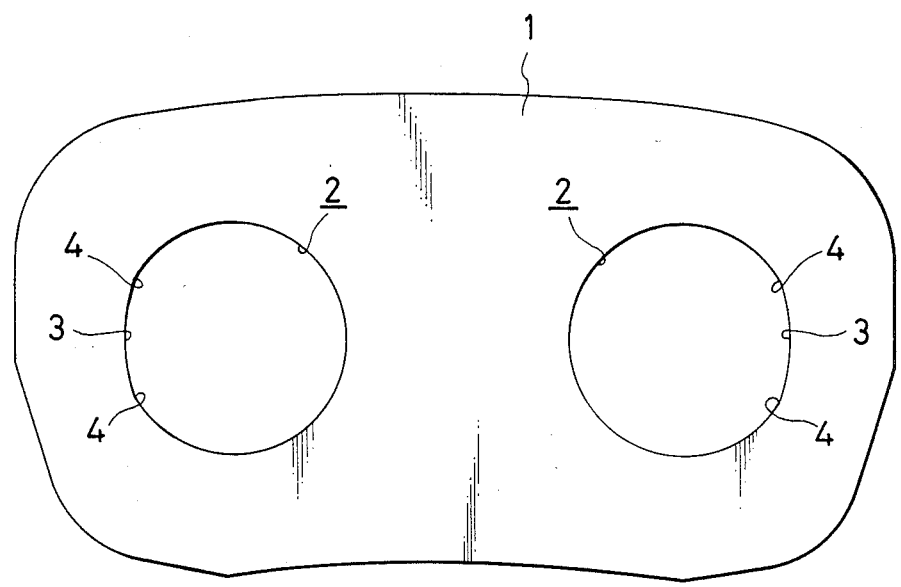
FIG. 2 is a side elevation of a link plate of a CVT chain according to the present invention; and, FIG. 3 is a side elevation, in enlarged scale, of a bore of the link plate according to the present invention, showing inserted rocker pins.
Figure 3:
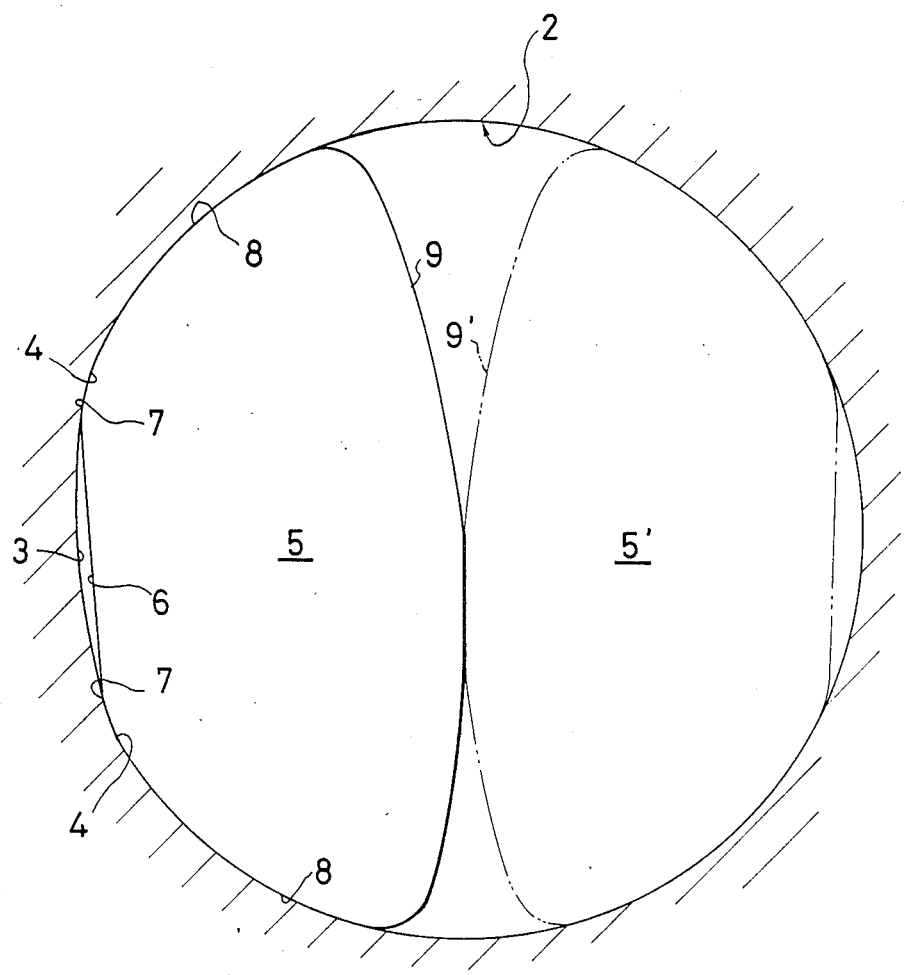

As shown in FIGS. 2 and 3, a link plate 1 has insertion bore 2 formed therein of nearly circular shape. At the load transmitting side of the bore, an arcuate surface 3, for preventing rocker pin rotation, is formed with connecting curved surfaces 4, 4 at each end. On the other hand, a planar surface 6 is formed at the load transmitting surface of the rocker pin 5, opposing the arcuate surface 3 of the bore. Planar surface 6 is connected to arcuate convex surfaces 8, 8 by connecting curved surfaces 7, 7.

The convex surfaces 8, 8 have the same center and the same radii of curvature as those of the (nearly) circular bore 2. By virtue of the above-mentioned structure, the convex surfaces 8, 8 of the rocker pin 5 can closely fit the bore 2, whereas the planar portion 6 of the rocker pin 5 is separated from the arcuate rotation prevention portion 3 formed at a portion of the load transmitting surface of the bore 2. Since the arcuate portion 3 has a greater radius of curvature than that of the convex surfaces 8, 8, relative rotation between the rocker pin 5 and the bore 2 is effectively prevented.

The back side of the rocker pin 5 is formed with a rolling surface 9 which is adapted to make a rolling contact with the counterpart rolling surface 9' of the other 5' of the rocker pins forming a pair, as indicated by the phantom line in FIG. 3.

According to the present invention, the load transmitting surface of the rocker pin is formed by the arcuate convex surface elements 8, 8 each having the same center and the same radius of curvature as those of the rocker pin insertion bore 2, and the planar portion 6. The shapes have therefore been substantially simplified and the manufacturing process has also been quite simplified, as compared with the conventional load transmitting surface formed by a plurality of adjoining convex surfaces of differing radii of curvature. Likewise, as regards the bores in the link plates, only the portion opposing the planar portion of the rocker pin is made as an arcuate concave portion having a radius of curvature greater than that of the bore, thus substantially simplifying the shape thereof. This assures that manufacturing is easier and assures that the rocker pins will closely fit the bores without the need to achieve substantial precision in manufacturing tolerances heretofore necessary. In addition, the lengths of the closely fitting surfaces may be made long enough to reduce the pressure per unit area due to the load. Relative movement between the rocker pin and the bore may be positively prevented by the fact that the radius of curvature of the rotation prevention surface is greater than that of the bore. Furthermore, since the planar portion of the rocker pin is not in contact with the arcuate rotation prevention portion of the bore, the load may be uniformly distributed to the closely fitting surfaces of the rocker pin and the bore having the same center and the same radii of curvature, which assures non-occurrence of point or local concentrations of stress in the load transmitting surfaces.

The invention may be embodied in other specific forms without departing from the spirit or essential attributes thereof. Accordingly, reference should be made to the appended claims, rather than the foregoing specification, as indicating the scope of the invention.

What is claimed is:

1. A rocker pin type continuously variable transmission chain, comprising:
   a plurality of frictionally driven blocks;
   a plurality of link plates connected endlessly by paired rocker pins, the rocker pins each having a load transmitting surface formed by a planar portion and a pair of arcuate convex portions, each of the pair of arcuate convex portions having the same radius of curvature;
   the link plates each having rocker pin insertion bores formed in part to closely fit the convex portions of the rocker pins and form load transmitting surfaces for each bore; and,
   each of the load transmitting surfaces of each bore having an arcuate portion, opposing the planar portion of each rocker pin, with a radius of curvature greater than that of the convex portions of the rocker pins to prevent rotation of the rocker pins in the bores, whereby load forces are transmitted by extensive surface contact areas.

2. An improved rocker pin type continuously variable transmission chain having a plurality of frictionally driven blocks and a plurality of link plates connected endlessly by paired rocker pins, the improved chain comprising:
   the rocker pins each having a load transmitting surface formed by a planar portion and a pair of arcuate convex portions, each of the pair of arcuate convex portions having the same radius of curvature;
   the link plates each having rocker pin insertion bores formed in part to closely fit the convex portions of the rocker pins and form load transmitting surfaces for each bore; and,
   each of the load transmitting surfaces of each bore having an arcuate portion, opposing the planar portion of each rocker pin, with a radius of curvature greater than that of the convex portions of the rocker pins to prevent rotation of the rocker pins in the bores, whereby load forces are transmitted by extensive surface contact areas.

* * * * *